3,699,055
TRIARYLPHOSPHINE, ALKYLLITHIUM, AND 1,3-DIHALOBENZENE POLYMERIZATION INITIATOR FOR CONJUGATED DIENE POLYMERIZATION
William J. Trepka, Bartlesville, Okla., assignor to Phillips Petroleum Company
No Drawing. Original application Mar. 6, 1970, Ser. No. 17,310, now Patent No. 3,631,015. Divided and this application July 19, 1971, Ser. No. 164,097
Int. Cl. C08d 3/04; C08p 3/16
U.S. Cl. 252—431 P                 8 Claims

ABSTRACT OF THE DISCLOSURE

A method of manufacturing high cis-polydienes by polymerizing a conjugated diene with an initiator prepared by reacting a triarylphosphine, an alkyllithium and a 1,3-di-halobenzene.

---

This application is a division of my copending application Ser. No. 17,310, filed Mar. 6, 1970, now Pat. No. 3,631,015.

This invention relates to an improved method of polymerizing conjugated dienes. In another aspect, this invention relates to an improved polymerization initiator and to the process for preparing same.

The art has shown a great deal of interest in the development of processes for producing diolefin polymers and polymers of diolefins prepared by modern processes have received wide acceptance. A more recent discovery in the field of diene polymerization by certain initiator systems makes possible the formation of polymers having desired configurations. The polymers formed by the use of these initiator systems often have outstanding physical properties which render them equal to or superior to natural rubber.

Organolithium compounds more recently have been employed in the presence of hydrocarbon solvents with success as initiators for conjugated diene polymerization. Those skilled in the art have long been seeking polymerization initiators for conjugated diene polymerization resulting in high conversion rates with relatively high cis content, and a viscosity range suitable for good processability.

It is an object of this invention to provide initiators for the polymerization of conjugated dienes which promote high yield rates of high cis polymers having improved physical properties.

It is another object of this invention to provide a process for the polymerization of conjugated dienes.

It is yet another object of this invention to provide a process for producing a conjugated diene polymerization initiator.

The use of organophosphines as additives in the preparation of polymerization iniators represents broadly a part of my invention. Another broad aspect of my invention provides a process for the polymerization of conjugated diene monomers, particularly butadiene, isoprene, and mixtures thereof, by contacting same with an initiator reaction mixture initially comprised of a triarylphosphine, an alkyllithium, and a 1,3-dihalobenzene. The initiators of this invention are selected from a reaction mixture of an alkyllithium material having a range of about 1 to 25 carbon atoms per molecule; a 1,3-dihalobenzene wherein the halogens can be chlorine, bromine, or iodine; and a triarylphosphine wherein the aryl functions of the phosphine can be derived from benzene, naphthalene, and the like, having generally in the range of 6 to about 12 carbon atoms per aryl group. The initiators of this invention can be prepared by several methods, but for preferred results the 1,3-dihalobenzene, the alkyllithium, and the triarylphosphine are blended prior to addition of the resultant initiator system to the monomer.

The initiator of this invention is prepared having the following molar ratios: 1 to 6 mols of 1,3-dihalobenzene are employed for each mol of triarylphosphine preferably 2 to 4 mols of 1,3-dihalobenzene are employed for each mol of triarylphosphine; 1 to 1.5 mols of 1,3-dihalobenzene are employed for each mol of alkyllithium, preferably 1 mol of 1,3-dihalobenzene per mol of alkyllithium is employed.

Examples of suitable 1,3-dihalobenzene compounds include: 1,3-dichlorobenzene; 1,3-dibromobenzene; 1,3-diodobenzene; 1-bromo-3-chlorobenzene; 1-chloro-3-iodobenzene; and the like.

Examples of suitable alkyllithium compounds include: methyllithium; pentacosyllithium; butyllithium; propyllithium; 1,1-dimethylethyllithium; 2-methylpropyllithium, and the like.

Examples of suitable triarylphosphines include: triphenylphosphine; tri(2-naphthyl)phosphine; tri(1-naphthyl)-phosphine, and the like.

According to the invention, an improved cis content is realized by an initiator system prepared by contacting a 1,3-dihalobenzene, an alkyllithium, and a triarylphosphine. A specific example of the initiator system of this invention is the reaction product of an initial mixture of 1,3-dibromobenzene, triphenylphosphine, and butyllithium in toluene, wherein said reaction mixture produces an active initiator for cis polyisoprene production.

Examples of some of the conjugated diene monomers containing 4 to 12 carbon atoms per molecule which can be polymerized in the presence of the initiator system of this invention are as follows: 1,3-butadiene, isoprene, 2,3-dimethyl-1,3-butadiene, 2,3-diethyl-1,3-butadiene, 1,3-pentadiene, 2-phenyl-1,3-butadiene, 1,3-octadiene, 1,3-dodecadiene, and the like.

The polymerization initiators of this invention can be prepared in a hydrocarbon or polar medium. When a polar solvent is used for the initiator preparation, it is desirable that it be replaced with a hydrocarbon diluent prior to addition of the initiator to the polymerizable monomer. The relatively high boiling or heavy hydrocarbon dispersing media is advantageous in that it serves to coat the initiator particles and keep them in a highly dispersed form as well as rendering them nonpyrophoric and consequently easy to handle. Examples of hydrocarbon diluents are benzene, toluene, cyclohexane, methylcyclohexane, xylene, n-butane, n-hexane, n-pentane, n-heptane, isooctane, mixtures thereof and the like. Examples of polar solvents are tetrahydrofuran and diethyl ether.

To effect polymerization of conjugated dienes such as butadiene, isoprene, and mixtures thereof, the monomer or monomers is contacted with an initiator of the invention. The temperature employed for polymerization is generally within the range of −100° C. (−148° F.) to 150° C. (302° F.), preferably from −75° C. (−103° F.) to 100° C. (212° F.). The particular temperature employed depends upon both the monomer and the initiator used in the polymerization. The pressure employed during polymerization should be sufficient to maintain the reaction mixture substantially in the liquid phase. Preferably, the polymerization is effected in the presence of an inert atmosphere such as argon, helium, nitrogen, and the like.

The polymerization is preferably carried out in the presence of a suitable diluent, such as benzene, toluene, cyclohexane, methylcyclohexane, xylene, n-butane, n-hexane, n-pentane, n-heptane, isooctane, mixtures thereof, and the like. Generally, the diluent is selected from hydrocarbons such as the paraffins, cycloparaffins, and aromatics containing from 4 to 10 carbon atoms per molecule.

In practice, the polymerization reaction can be effected as follows. Polymerization runs can be effected by charging monomer to a reactor after charging same with cyclohexane diluent and purging with nitrogen. The monomer can be added to the reactor by means of a closed dispenser. The initiator can be charged by means of a syringe, and the reactor can be tumbled. Upon completion of reaction, the polymer can be coagulated with isopropanol and stabilized with one percent 2,2'-methylene-bis(4-methyl-6-butylphenol).

The products resulting from a polymerization of butadiene or isoprene are generally obtained in solution form which can be treated with various reagents to produce functional groups by replacing the terminal lithium atoms on the polymer molecules. For example, polymer in solution can be contacted first with carbon dioxide and then with an acid to replace the lithium atoms with —COOH groups. Other functional groups which can be introduced include —SH, —OH, and the like. Alternatively, the unquenched polymer solutions can be treated with an alcohol or other reagent to inactivate the initiator and/or precipitate polymer which is then recovered without functional groups.

The rubbery polymers of isoprene or butadiene produced in accordance with this invention can be compounded by any of the known methods for compounding rubbers. Vulcanizing agent, vulcanization accelerators, accelerator activators, reinforcing agent, antioxidants, softeners, plasticizers, fillers, and other compounding ingredients normally employed in rubbers can likewise be used in the polymers of this invention. The rubbery diene polymers have utility in applications where both natural and synthetic rubbers are used. In addition, the rubbery polymers produced by the method of this invention can be blended by any suitable method with other synthetic rubbers and/or natural rubber. For example, they can be used in the manufacture of automobile tires, gaskets, and other rubbery articles.

The quantity of initiator employed during the polymerization can vary appreciably depending on the initiator selected, the polymerization conditions, and the nature and purity of the monomers. The amount is generally expressed in terms of milliequivalents of lithium per 100 grams of monomer. In general, the quantity employed is that which contains from 0.1 to 40 milliequivalents of lithium per 100 grams of monomer, but preferably, initiator concentration level will be no greater than 5 and no less than 0.5 milliequivalents of lithium per 100 grams of monomer. As disclosed above, the initiators of this invention are effective in producing high monomer conversion levels, and in producing polymers having a relatively high percentage of cis-1,4-addition and improved processability, even when initiator concentration level is no greater than 5 milliequivalents of lithium per 100 grams of monomer.

The following examples demonstrate the effectiveness as well as recipe for the initiators of this invention.

EXAMPLE I

A series of initiators was prepared according to the following recipe:

TABLE I

| Run | 1 | 2 | 3 | Control, 4 |
|---|---|---|---|---|
| 1,3-dibromobenzene, mmoles | 20 | 20 | 20 | 10 |
| Triphenylphosphine, mmoles | 5 | 6.7 | 10 | 0 |
| Toluene, ml | 110 | 110 | 110 | 60 |
| Butyllithium, mmoles | 20 | 20 | 20 | 10 |
| Time, hours | 2 | 2 | 2 | 2 |
| Temperature, °F | 122 | 122 | 122 | 122 |

Charge order was cyclohexane, nitrogen purge, triphenylphosphine, 1,3-dibromobenzene, butyllithium.

Polymerization runs employing each of the initiators above were effected by charging monomer to a reactor after charging same with cyclohexane diluent and purging the reactor for five minutes with 3 liters per minute of nitrogen. The monomer was added to the reactor by means of a syringe, the initiator was charged by means of a syringe, and the reactor was tumbled at 158° F. Upon completion of the reaction the polymer was coagulated with isopropanol and stabilized with one percent 2,2'-methylene-bis-(4-methyl-6-butylphenol).

The initiator compositions prepared above were employed to initiate isoprene polymerization by the method described as is presented by the following recipe. The initiator prepared in Run 1 above was employed in Run 1 below with other initiators being employed in corresponding runs.

TABLE II

| | |
|---|---|
| Isoprene, parts by weight | 100 |
| Cyclohexane, parts by weight | 1000 |
| Initiator | Variable |
| Temperature, °F. | 158 |
| Time, hours | 3.0 |

Polymers were produced and characterized as to microstructure by conventional tests. Results appear in Table III.

TABLE III

| | DBB/Ph$_3$P [1] | Initiator concentration [2] in meqhm. | Microstructure,[3] percent cis |
|---|---|---|---|
| Run: | | | |
| 1 | 4/1 | 1.1 | 98 |
| 2 | 3/1 | 1.1 | 96 |
| 3 | 2/1 | 1.1 | 95 |
| 4 (control) | 1/0 | 1.0 | 94 |

[1] DBB/Ph$_3$P is the ratio:moles of 1,3-dibromobenzene/mole of triphenylphosphine.
[2] As milliequivalents of Li per 100 grams of monomer.
[3] Microstructures were determined using a commercial infrared spectrometer. The samples were dissolved in carbon disulfide so as to form a solution containing 25 grams of polymer per liter of solution. Calibrations were based on deproteinized natural rubber as a reference material assuming that it contained 98 percent cis and 2 percent 3,4-addition product. The cis was measured at the 8.9 micron band.

These data demonstrate that the initiator systems of this invention yield improved cis contents as compared to systems which do not have triphenylphosphine.

EXAMPLE II

The procedure of Example I was repeated except that tributylphosphine rather than triphenylphosphine was employed.

Polymers were produced and characterized as to microstructure by conventional tests. Results appear below in Table IV.

TABLE IV

| | DBB/Bu$_3$P [1] | Initiator concentration [2] in meqhm. | Microstructure,[3] percent cis |
|---|---|---|---|
| Run: | | | |
| 5 | 4/1 | 1.3 | 79 |
| 6 | 2/1 | 1.0 | 76 |

[1] DBB/Bu$_3$P is the ratio:moles of 1,3-dibromobenzene/moles of tributylphosphine.
[2] As in Table III.
[3] As in Table III.

These data demonstrate that tributylphosphine does not have the beneficial effect on cis content that triphenylphosphine has and, indeed, tributylphosphine has a deleterious effect on cis content as compared to control Run 4 in Example I.

EXAMPLE III

A 3-bromophenyllithium initiator was prepared essentially as in control Run 4 of Example I.

Polymerization runs essentially as in Example I were effected, but triphenylphosphine was charged by means of a syringe subsequent to charging of the monomer but prior to charging of the initiator in amounts as indicated in Table V. Polymers were produced and characterized as to microstructure. Results appear in Table V below.

TABLE V

| | DBB/Ph₃P [1] | Initiator concentration [2] in meqhm. | Microstructure, percent cis |
|---|---|---|---|
| Run: | | | |
| 7 | 4/1 | 1.0 | 86 |
| 8 | 1/1 | 1.0 | 86 |

[1] See footnote 1 to Table III
[2] See footnote 2 to Table III

These data demonstrate that high cis contents are not produced when triphenylphosphine is added to the monomer prior to addition of the initiator rather than being present during the formation of the initiator.

Reasonable variations and modifications of this invention can be made, or followed, in view of the foregoing disclosure, without departing from the spirit or scope thereof.

What I claim is:

1. A process for preparing a polymerization initiator comprising: contacting an alkyllithium and a 1,3-dihalobenzene having halogens selected from the group consisting of chlorine, bromine and iodine, in the presence of a triarylphosphine additive and a high boiling hydrocarbon diluent or polar solvent, wherein the mole ratio of 1,3-diahalobenzene to triarylphosphine is from 1:1 to 6:1 and the mole ratio of 1,3-dihalobenzene to alkyllithium is from 1:1 to 1.5:1.

2. A process according to claim 1 wherein the alkyllithium has from about 1 to about 25 carbon atoms per molecule and the triarylphosphine contains aryl groups having from 6 to about 12 carbon atoms per aryl group.

3. A process according to claim 1 wherein the high boiling hydrocarbon diluent is selected from at least one of toluene, benzene, cyclohexane, methylcyclohexane, xylene, n-butane, n-hexane, n-pentane, n-heptane, and isooctane.

4. A process according to claim 1 wherein the polar solvent is selected from the group consisting of tetrahydrofuran and diethyl ether.

5. A process according to claim 3 wherein the alkyllithium is butyllithium, the 1,3-dihalobenzene is 1,3-dibromobenzene, and the triarylphosphine is triphenylphosphine.

6. A polymerization initiator comprising: the reactive mixture of an alkyllithium; a 1,3-dihalobenzene having halogen selected from the group consisting of chlorine, bromine, and iodine; and a triarlylphosphine wherein the mole ratio of 1,3-dihalobenzene to triarylphosphine is from 1:1 to 6:1, and the mole ratio of 1,3-dihalobenzene to alkyllithium is from 1:1 to 1.5:1.

7. A polymerization initiator according to claim 6 wherein the alkyllithium has from about 1 to about 25 carbon atoms per molecule and the triarylphosphine contains aryl groups having from 6 to about 12 carbon atoms per aryl group.

8. A polymerization initiator according to claim 6 wherein the alkyllithium is butyllithium, the 1,3-dihalobenzene is 1,3-dibromobenzene, and the triarylphosphine is triphenylphosphine.

References Cited
UNITED STATES PATENTS

| 3,215,679 | 11/1965 | Trepka | 252—431 L |
| 3,514,436 | 5/1970 | Trepka et al. | 252—431 L |

PATRICK P. GARVIN, Primary Examiner

U.S. Cl. X.R.

251—431 L